United States Patent
Suzuki

(10) Patent No.: US 9,002,738 B2
(45) Date of Patent: Apr. 7, 2015

(54) BILLING MANAGEMENT SYSTEM AND BILLING MANAGEMENT METHOD

(75) Inventor: Fumio Suzuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 46 days.

(21) Appl. No.: 13/410,584

(22) Filed: Mar. 2, 2012

(65) Prior Publication Data

US 2013/0030968 A1 Jan. 31, 2013

(30) Foreign Application Priority Data

Jul. 25, 2011 (JP) .................................. 2011-162091

(51) Int. Cl.
*G07F 19/00* (2006.01)
*G06Q 20/14* (2012.01)
*G06Q 30/04* (2012.01)
*G07F 17/26* (2006.01)

(52) U.S. Cl.
CPC ................ *G06Q 20/14* (2013.01); *G06Q 30/04* (2013.01); *G07F 17/266* (2013.01)

(58) Field of Classification Search
CPC ....... G06Q 10/00; G06Q 10/02; G06Q 10/06; G06Q 20/145; G06Q 20/102; G06Q 30/04; G06Q 50/06
USPC .......................................................... 705/34
See application file for complete search history.

(56) References Cited

U.S. PATENT DOCUMENTS

| | | | |
|---|---|---|---|
| 2002/0188562 A1* | 12/2002 | Igarashi et al. | 705/40 |
| 2003/0031475 A1* | 2/2003 | Asakura | 399/12 |
| 2003/0123700 A1* | 7/2003 | Wakao | 382/100 |
| 2006/0136992 A1* | 6/2006 | Shigeeda | 726/2 |
| 2009/0276771 A1* | 11/2009 | Nickolov et al. | 717/177 |
| 2010/0067036 A1* | 3/2010 | Oka | 358/1.14 |

FOREIGN PATENT DOCUMENTS

JP 2010-108089 A 5/2010

OTHER PUBLICATIONS

Stephenson, Neil. Caught in the rush of the news: the young and the old and the promise of educational technology. University of Calgary (Canada), UMI Dissertations Publishing, 2011.*

* cited by examiner

Primary Examiner — Ryan Zeender
Assistant Examiner — Fawaad Haider
(74) Attorney, Agent, or Firm — Sughrue Mion, PLLC

(57) ABSTRACT

A billing management system includes an image forming device that forms an image, a reading device that reads identification information from an information recording medium that stores the identification information identifying a user of the image forming device, a billing condition management device that manages, in an associated state, the identification information and a billing condition, and a billing information transmitting unit that references the identification information and the billing condition, managed by the billing condition management device, and transmits billing information in accordance with the billing condition corresponding to the identification information read by the reading device.

7 Claims, 8 Drawing Sheets

FIG. 3B

SCHEME F

| SHEET SIZE | PRINT MODE | |
|---|---|---|
| | COLOR | MONOCHROME |
| A3 | 0 | 0 |
| A4 | 0 | 0 |
| A5 | 0 | 0 |
| ... | ... | ... |

SCHEME A

| SHEET SIZE | PRINT MODE | |
|---|---|---|
| | COLOR | MONOCHROME |
| A3 | 30 | 20 |
| A4 | 20 | 10 |
| A5 | 10 | 5 |
| ... | ... | ... |

SCHEME B

| SHEET SIZE | PRINT MODE | |
|---|---|---|
| | COLOR | MONOCHROME |
| A3 | 40 | 30 |
| A4 | 30 | 20 |
| A5 | 20 | 15 |
| ... | ... | ... |

FIG. 3A

| IDENTIFICATION INFORMATION | BILLING SCHEME |
|---|---|
| 0001 | F |
| 0002 | F |
| 0003 | A |
| 0004 | B |
| 0005 | A |
| ... | ... |

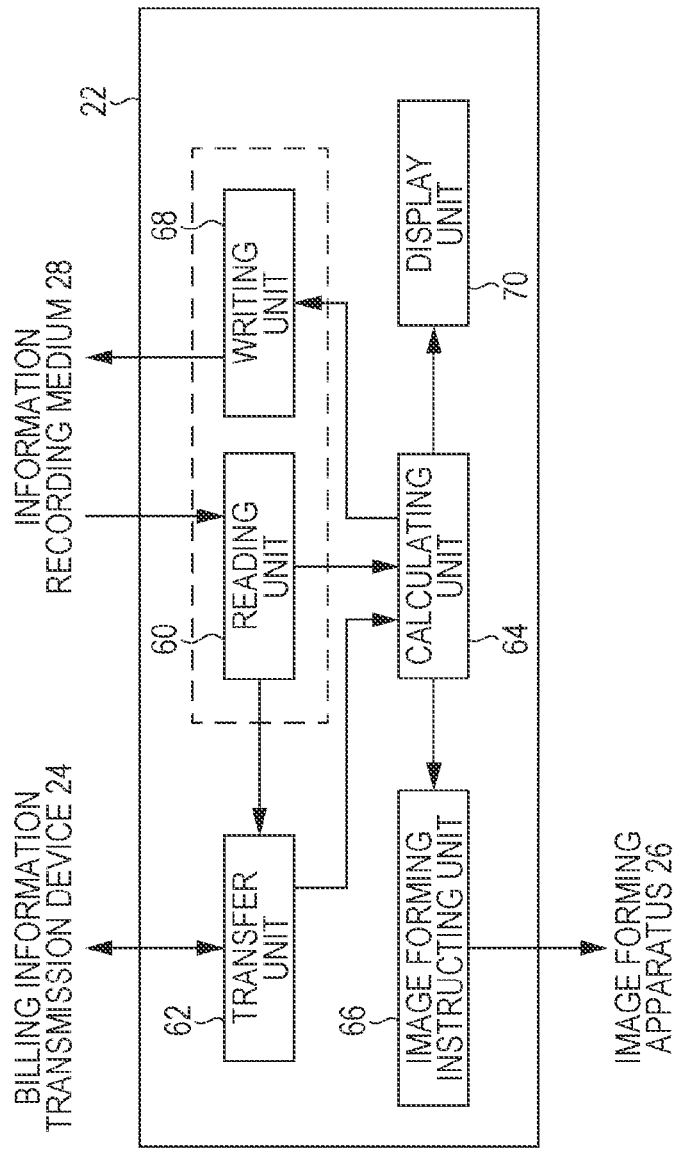

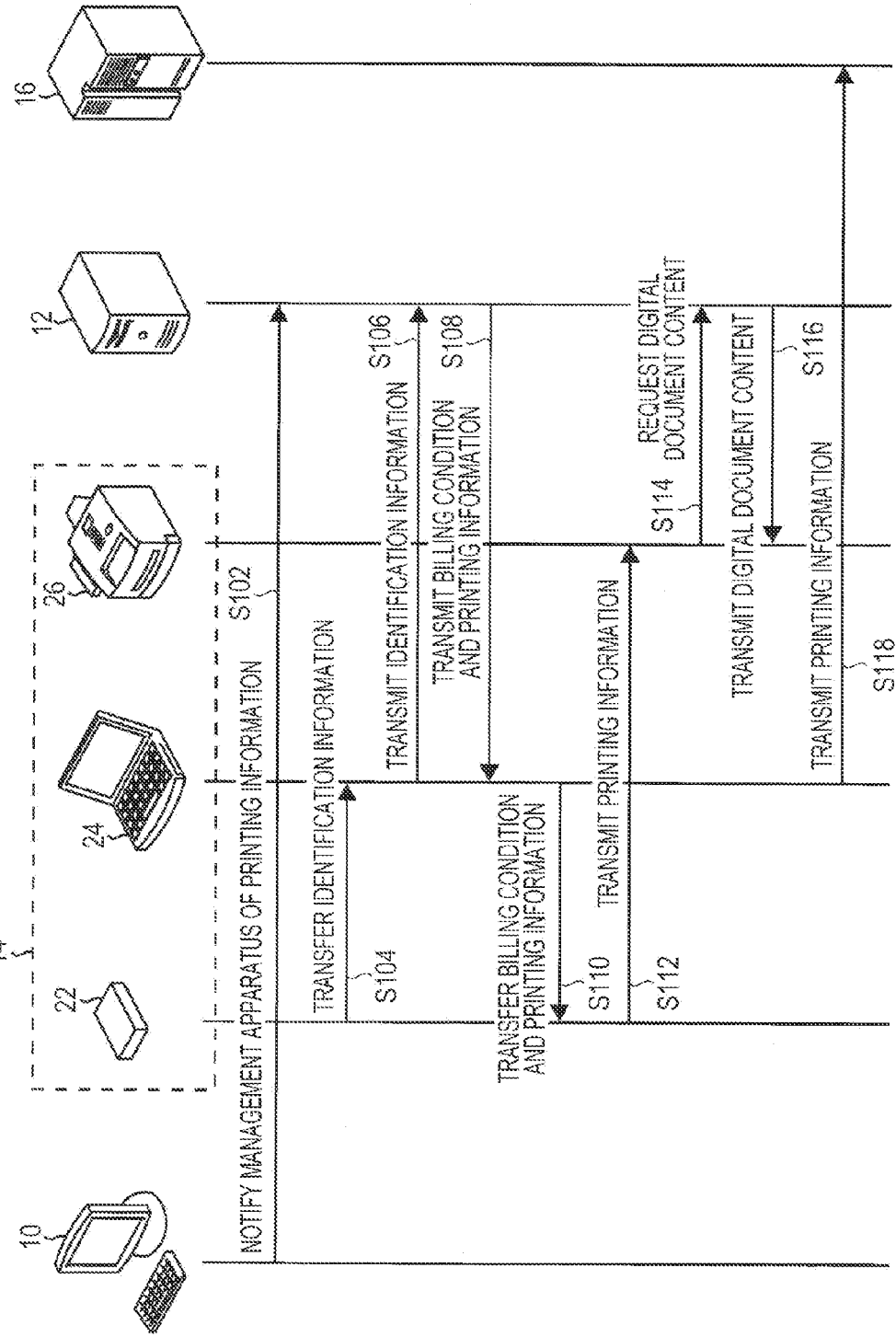

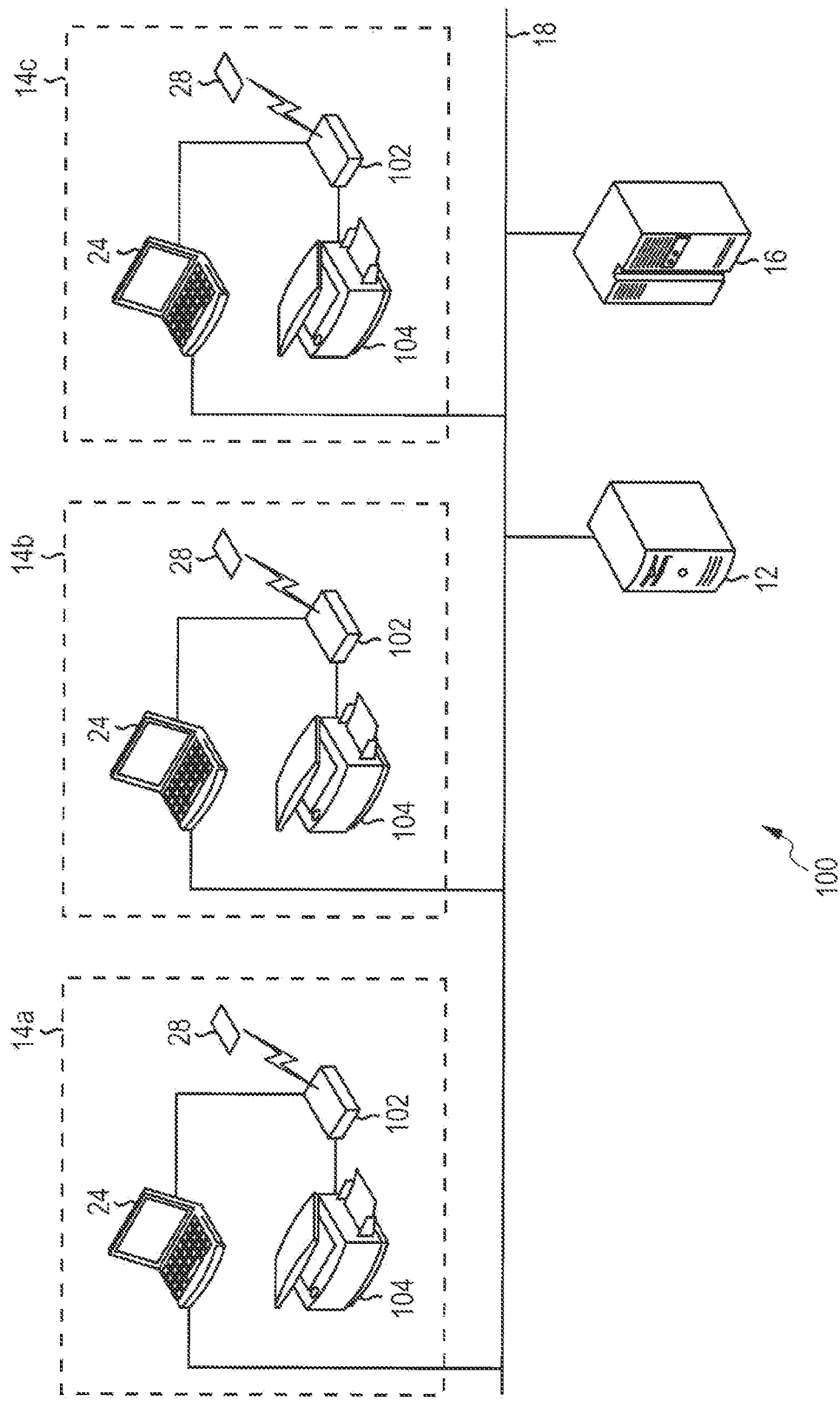

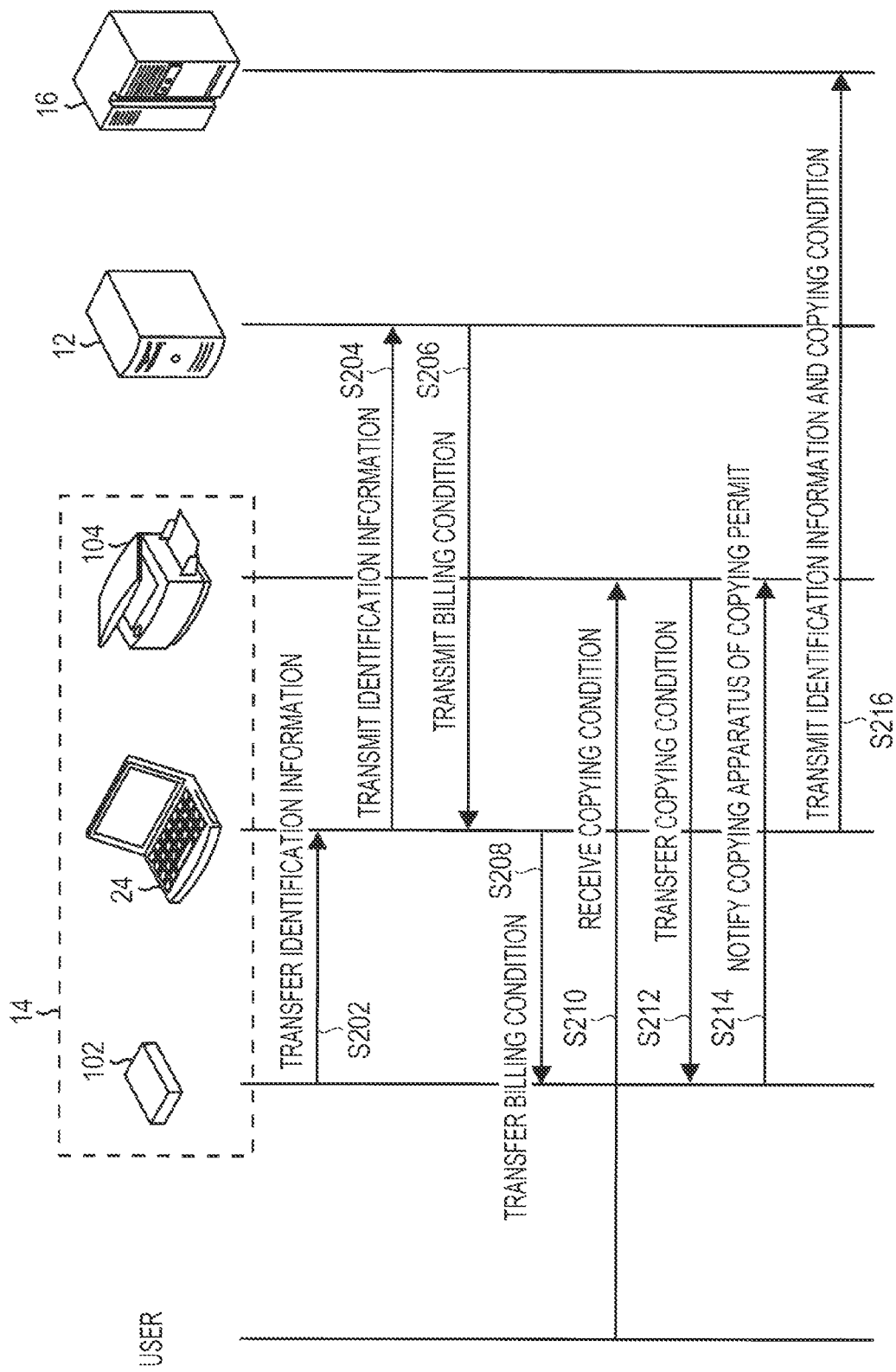

BILLING MANAGEMENT SYSTEM AND BILLING MANAGEMENT METHOD

CROSS-REFERENCE TO RELATED APPLICATIONS

This application is based on and claims priority under 35 USC 119 from Japanese Patent Application No. 2011-162091 filed Jul. 25, 2011.

BACKGROUND

Technical Field

The present invention relates to a billing management system and a billing management method.

SUMMARY

According to an aspect of the invention, there is provided a billing management system including an image forming device that forms an image, a reading device that reads identification information from an information recording medium that stores the identification information identifying a user of the image forming device, a billing condition management device that manages, in an associated state, the identification information and a billing condition, and a billing information transmitting unit that references the identification information and the billing condition, managed by the billing condition management device, and transmits billing information in accordance with the billing condition corresponding to the identification information read by the reading device.

BRIEF DESCRIPTION OF THE DRAWINGS

Exemplary embodiment of the present invention will be described in detail based on the following figures, wherein:

FIGS. 3A and 3B illustrate an example of identification information and a billing condition managed by a management device of the first exemplary embodiment of the present invention;

FIG. 4A is a functional block diagram of a reading device of the first exemplary embodiment of the present invention, and FIG. 4B illustrates information stored on an information recording medium;

FIG. 5 is a flowchart illustrating an operation of the billing management system of the first exemplary embodiment of the present invention;

FIG. 6 generally illustrates a configuration of a billing management system of a second exemplary embodiment of the present invention;

FIG. 8 is a flowchart illustrating an operation of the billing management system of the first exemplary embodiment.

DETAILED DESCRIPTION

First Exemplary Embodiment

The exemplary embodiments of the present invention are described below.

Figure 1:
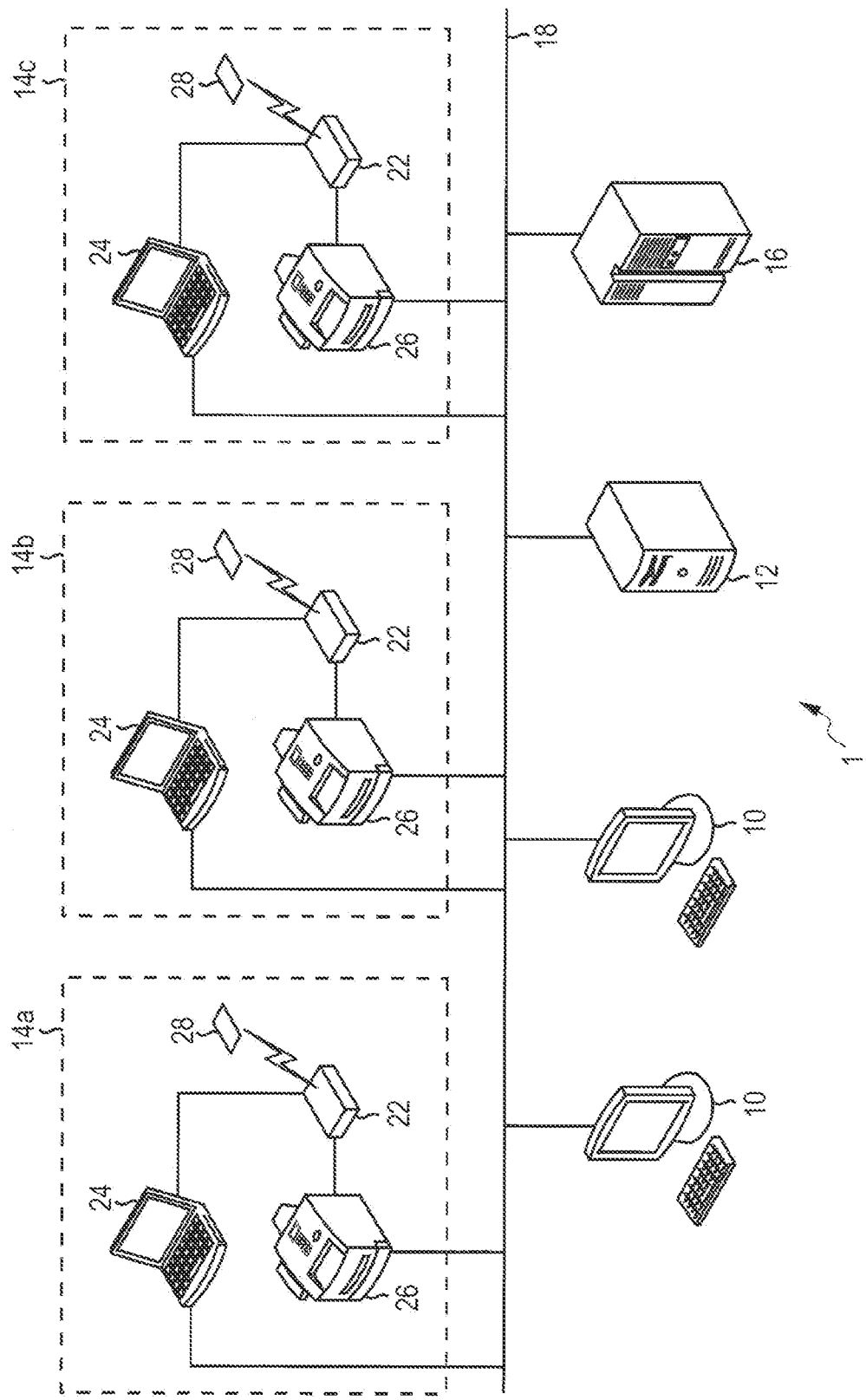
FIG. 1 generally illustrates a configuration of a billing management system of a first exemplary embodiment of the present invention.

FIG. 1 generally illustrates a configuration of a billing management system 1 of a first exemplary embodiment of the present invention.

The billing management system 1 may be used in a campus. In a campus, for example, a variety of people (including teaching staff, students, and other persons) may form images using shared apparatuses at a variety of locations in a premise managed by the same operator.

The billing management system 1 includes multiple terminal apparatuses 10 operated by users, the management apparatus 12, multiple image forming apparatuses 14a, 14b, and 14c having billing function, and calculating apparatus 16, and a network 18, such as LAN (local-area network) or WAN (wide-area network), interconnecting these elements.

The multiple terminal apparatuses 10 and the multiple image forming apparatuses 14a, 14b, and 14c having billing function may be installed at different locations and facilities.

The multiple image forming apparatuses 14a, 14b, and 14c having billing function are identical to each other in structure. In the discussion that follows, each of the multiple image forming apparatuses 14a, 14b, and 14c with billing function may be occasionally represented by an image forming apparatus 14. The same is true of devices in the image forming apparatus 14 with billing function.

The number of image forming apparatuses 14 with billing function is set to be larger than the number of management apparatuses 12. According to the first exemplary embodiment, a plurality of image forming apparatuses 14 with billing function are arranged for one management apparatuses 12.

The terminal apparatus 10 issues a request to print the content of a digital document on a recording medium such as a paper sheet in response to a request from a user. The terminal apparatus 10 may include a personal computer (PC).

More specifically, the terminal apparatus 10 notifies the management apparatus 12 of printing information in response to a request from the user.

The printing information includes document identification information and printing condition.

The document identification information includes identification information of a user having requested printing, the name of the document, the time and date on which the printing request is issued. The identification information uniquely identifies the user.

The printing conditions include the number of copies, the size of paper sheets, and a print mode (color printing, or monochrome printing).

The management apparatus 12 manages in an associated state the identification information and billing condition. The management apparatus 12 also manages the content of a digital document (information related to documents, images, and contents to be printed) the user has requested to be printed.

The management apparatus 12 may include a general-purpose server computer, for example.

The image forming apparatus 14 with billing function authenticates the user, bills charge to the user under the billing condition corresponding to the user, and forms an image.

The image forming apparatus 14 with billing function includes reading device 22, billing information transmission device 24, and image forming apparatus 26.

The reading device 22 reads the identification information and frequency information from an information recording medium 28 (see FIG. 4B), such as an IC card, storing the identification information and the frequency information. The reading device 22 transfers the read identification information and frequency information to the billing information transmission device 24. The reading device 22 is connected to the billing information transmission device 24 via a universal serial bus (USB), for example.

The frequency information is represented by point and may be used when the image forming apparatus 26 is used.

The reading device 22 rewrites the frequency information of the information recording medium 28 under the billing condition corresponding to the identification information read from the information recording medium 28.

The frequency information stored on the information recording medium 28 may be a charge that the user bills using a predetermined device, or may be a predetermined fixed amount that is input in advance and then consumed until it is fully spent.

The billing information transmission device 24 references the management apparatus 12, and transfers to the reading device 22 the billing condition corresponding to the identification information transmitted from the reading device 22. The billing information transmission device 24 also transfers to the reading device 22 the printing information stored by the management apparatus 12 and corresponding to the identification information.

The billing information transmission device 24 may include a PC, for example.

Upon receiving a print instruction from the reading device 22, the image forming apparatus 26 receives the content of the document information from the management apparatus 12, and forms the content as an image on the recording medium such as a paper sheet.

The image forming apparatus 26 may include an electrophotographic image forming apparatus.

The calculating apparatus 16 calculates the aggregate of the printing information printed by the image forming apparatus 26 in each of the multiple image forming apparatuses 14 with billing function. The total expense of the multiple image forming apparatuses 26 is calculated based on the aggregate of the printing information calculated by the calculating apparatus 16.

The calculating apparatus 16 may manage, in an associated state, the identification information and the printing information of all the image forming apparatuses 26. The calculating apparatus 16 learns the number of color printed copies, the paper sheet size, and the like of each user.

A hardware configuration of the billing information transmission device 24 is described below.

Figure 2:
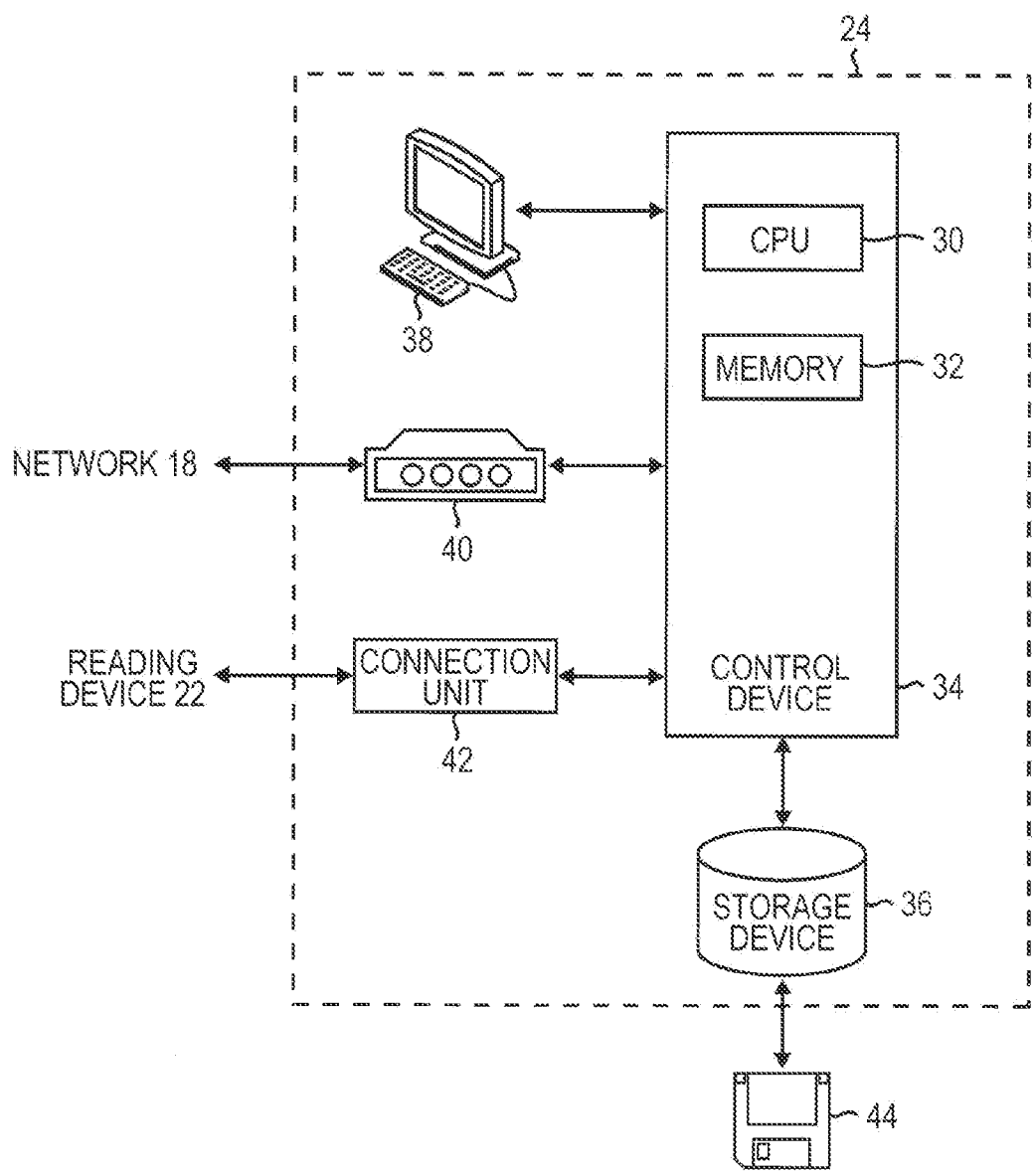
FIG. 2 illustrates a hardware configuration of a printing instruction device of the first exemplary embodiment of the present invention.

FIG. 2 illustrates the hardware configuration of the billing information transmission device 24.

The billing information transmission device 24 includes control device 34, storage device 36, user interface (UI) device 38, communication device 40, and connection unit 42. The control device 34 includes central processing unit (CPU) 30, memory 32, and the like. The storage device 36 includes a hard disk drive (HDD). The UI device 38 includes a display including a liquid-crystal display, and an input device including a keyboard, and a mouse. The communication device 40 exchanges information with the management apparatus 12 and the like via the network 18. The connection unit 42 is connected to and exchanges information with the reading device 22.

In the billing information transmission device 24, a predetermined billing management program is stored on the storage device 36 via an information transfer medium 44 such as the communication device 40 or a compact disk (CD), and is loaded on the memory 32. The billing management program is then executed on an operating system (OS) (not illustrated) on the control device 34.

Each of the terminal apparatus 10, the management apparatus 12, and the calculating apparatus 16 is identical in hardware structure to the billing information transmission device 24 not including the connection unit 42.

The communication device 40 in the terminal apparatus 10 exchanges information with the management apparatus 12 and the like via the network 18.

The communication device 40 in the management apparatus 12 exchanges information with each of the terminal apparatus 10, the billing information transmission device 24, the image forming apparatus 26, and the like via the network 18.

The communication device 40 in the calculating apparatus 16 exchanges information with the billing information transmission device 24 and the like via the network 18.

The identification information and the billing condition managed by the management apparatus 12 are described below.

FIGS. 3A and 3B illustrate the identification information and the billing condition managed by the management apparatus 12.

As illustrated in FIG. 3A, the management apparatus 12 manages a variety of billing schemes in an associated state with the identification information.

As illustrated in FIG. 3B, the billing scheme specifies a sheet size, and a value (frequency information about consumption) of the image forming apparatus responsive to the print mode (color printing or monochrome printing).

As illustrated in FIGS. 3A and 3B, a billing scheme F is applied to a user of identification information "0001" (more specifically a person who holds the information recording medium 28 storing the identification information "0001"). No frequency information is consumed for the user of the identification information "0001," and the user can thus use the image forming apparatus 26 free of charge.

A billing scheme A is applied to a user of identification information "0003." The frequency information responsive to the sheet size and the like is consumed for the user of the identification information "0003," and the user can use the image forming apparatus 26 at a charge.

A billing scheme B is applied to a user of identification information "0004" at a unit price different from the unit price applied to the user of the identification information "0003." The frequency information is consumed at a unit price different from the unit price of the user of the identification information "0003". The user of the identification information "0004" can use the image forming apparatus 26 at a charge.

For example, if the billing management system 1 is used in a university, the billing scheme F may be applied to teaching staff, the billing scheme A may be applied to visitors, and the billing scheme B may be applied to students. The management apparatus 12 generally manages the billing condition according to each user.

The billing condition responsive to each user is managed without the need for individually setting the reading device 22, the image forming apparatus 26, and the information recording medium 28 held by the user.

A functional configuration of the reading device 22 is described below.

FIG. 4A is a functional block diagram of the reading device 22.

FIG. 4B illustrates information stored on the information recording medium 28.

The reading device 22 includes reading unit 60, transfer unit 62, calculating unit 64, image forming instructing unit 66, writing unit 68, and display unit 70.

The reading unit 60 reads the identification information and the frequency information (see FIG. 4B) from the information recording medium 28. The reading unit 60 transfers the read identification information to the transfer unit 62, and the read frequency information to the calculating unit 64.

The transfer unit 62 transfers the identification information received from the reading unit 60 to the billing information transmission device 24. The transfer unit 62 receives from the billing information transmission device 24 the billing condition corresponding to the identification information and the printing information. The transfer unit 62 then transfers the billing condition and the printing information to the calculating unit 64.

The calculating unit 64 receives the frequency information from the reading unit 60, and the billing condition and the printing information from the transfer unit 62. The calculating unit 64 calculates a value billed for printing based on the received billing condition and frequency information. The calculating unit 64 calculates new frequency information (remaining amount) based on the billed value and the received frequency information.

The calculating unit 64 transfers calculation results to the writing unit 68 and the display unit 70.

If the calculation results are effective, the calculating unit 64 transfers the printing information to the image forming instructing unit 66. The effective calculation results mean that the read frequency information from the information recording medium 28 (the frequency information stored on the information recording medium 28) indicates a value higher than the billed value.

Upon receiving the printing information from the calculating unit 64, the image forming instructing unit 66 instructs the image forming apparatus 26 to form an image in response.

The writing unit 68 writes the calculation results received from the calculating unit 64 onto the information recording medium 28 as new frequency information.

The display unit 70 displays the billed value and the new frequency information based on the calculation results received from the calculating unit 64. The user may reference the display unit 70, thereby learning the billed value for printing and the remaining amount.

A billing operation of the billing management system 1 is described below.

FIG. 5 is a flowchart illustrating the billing operation (S10) of the billing management system 1.

In step S102, the terminal apparatus 10 transmits to the management apparatus 12 the printing information in response to a request from the user. The management apparatus 12 retains the printing information.

In step S104, the reading device 22 of one of the image forming apparatuses 14 with billing function reads the identification information from the information recording medium 28 of the user, and then transfers the identification information to the billing information transmission device 24.

For example, a user goes to the image forming apparatus 14 with billing function installed at a desired location, and holds the information recording medium 28 over the reading device 22 in the image forming apparatus 14 with billing function. The identification information is thus read.

In step S106, the billing information transmission device 24 transmits the identification information transferred from the reading device 22 to the management apparatus 12.

In step S108, the management apparatus 12 references information managed thereby, and transmits to the billing information transmission device 24 the billing condition corresponding to the identification information transmitted from the billing information transmission device 24. The management apparatus 12 also transmits to the billing information transmission device 24 the printing information stored thereon and corresponding to the identification information.

If the identification information fails to match the stored information (for example, if no corresponding identification information is present), the management apparatus 12 notifies the billing information transmission device 24 that the identification information fails to match the stored information.

In such a case, the identification information is not authenticated, and the user is not permitted to use the image forming apparatus 26. The display unit 70 in the reading device 22 and a display in the image forming apparatus 26 may display an indication to that effect.

In step S110, the billing information transmission device 24 transfers the billing condition corresponding to the identification information and the printing information to the reading device 22.

In step S112, the reading device 22 calculates new frequency information based on the billing condition and the printing condition, and transmits the printing information to the image forming apparatus 26 to instruct the image forming apparatus 26 to perform a printing operation.

If the remaining amount stored on the information recording medium 28 is insufficient, the reading device 22 does not transfer the printing information to the image forming apparatus 26.

The image forming apparatus 26 is not permitted to print the printing information for the user. Optionally, the display unit 70 in the reading device 22 may display an indication that the remaining amount is insufficient.

In step S114, the image forming apparatus 26 requests from the management apparatus 12 the content of a digital document corresponding to the printing information.

In step S116, the management apparatus 12 transmits the content of the digital document to the image forming apparatus 26 having requested the digital document.

Upon receiving the digital document, the image forming apparatus 26 prints the content of the digital document on a recording medium such as a paper sheet. Optionally, the image forming apparatus 26 may notify via the reading device 22 the billing information transmission device 24 that the printing operation has been completed.

The image forming apparatus 26 thus performs the printing operation responsive to the request from the user.

In step S118, the billing information transmission device 24 transmits to the calculating apparatus 16 the printing information actually printed out by the image forming apparatus 26.

Optionally, the billing information transmission device 24 may transmit to the calculating apparatus 16 the printing information of one whole day at predetermined time of the day.

According to the first exemplary embodiment, the management apparatus 12 manages in an associated state the identification information identifying the user and the billing scheme. Alternatively, the management apparatus 12 may manage information identifying each of the image forming apparatuses 26 in addition to the identification information and the billing scheme.

In such a case, the management apparatus 12 manages, in addition to the billing condition of each user, the unit price set for each image forming apparatus 26.

For example, a unit price may be set to be higher for a high-performance image forming apparatus 26, such as featuring a high image quality, than for the other image forming apparatuses 26. The unit price is thus set in view of a variety of parameters including performance, installation location, and frequency of uses of each of the image forming apparatuses 26.

According to the first exemplary embodiment, the billing information transmission device 24 references the identification information and the billing condition, managed by the management apparatus 12, and then transmits the billing information matching the billing condition to the reading device 22. Alternatively, the management apparatus 12 may transmit the billing information matching the billing condition to the reading device 22.

Second Exemplary Embodiment

A second exemplary embodiment of the present invention is described.

FIG. 6 generally illustrates a configuration of a billing management system 100 of the second exemplary embodiment.

The billing management system 100 includes the management apparatus 12, the multiple image forming apparatuses 14*a*, 14*b*, and 14*c* having billing function, the calculating apparatus 16, and the network 18 such as LAN or WAN interconnecting these elements.

According to the second exemplary embodiment, the image forming apparatus 14 with billing function includes reading device 102, billing information transmission device 24, and copying apparatus 104.

The copying apparatus 104 makes a copy of a paper sheet placed on the copying apparatus 104 by the user. The copying apparatus 104 does not need to receive the content of the digital document from the management apparatus 12. According to the second exemplary embodiment, the copying apparatus 104 is not connected to the network 18.

Optionally, the copying apparatus 104 may be connected to the network 18.

The copying apparatus 104 receives a copying condition from the user, and makes a copy in response to the copying condition, and transmits the copying condition to the reading device 102.

The copying conditions include the number of copies of print, the sheet size, and the print mode (color printing or monochrome printing).

The functional configuration of the reading device 102 of the second exemplary embodiment is described below.

Figure 7:
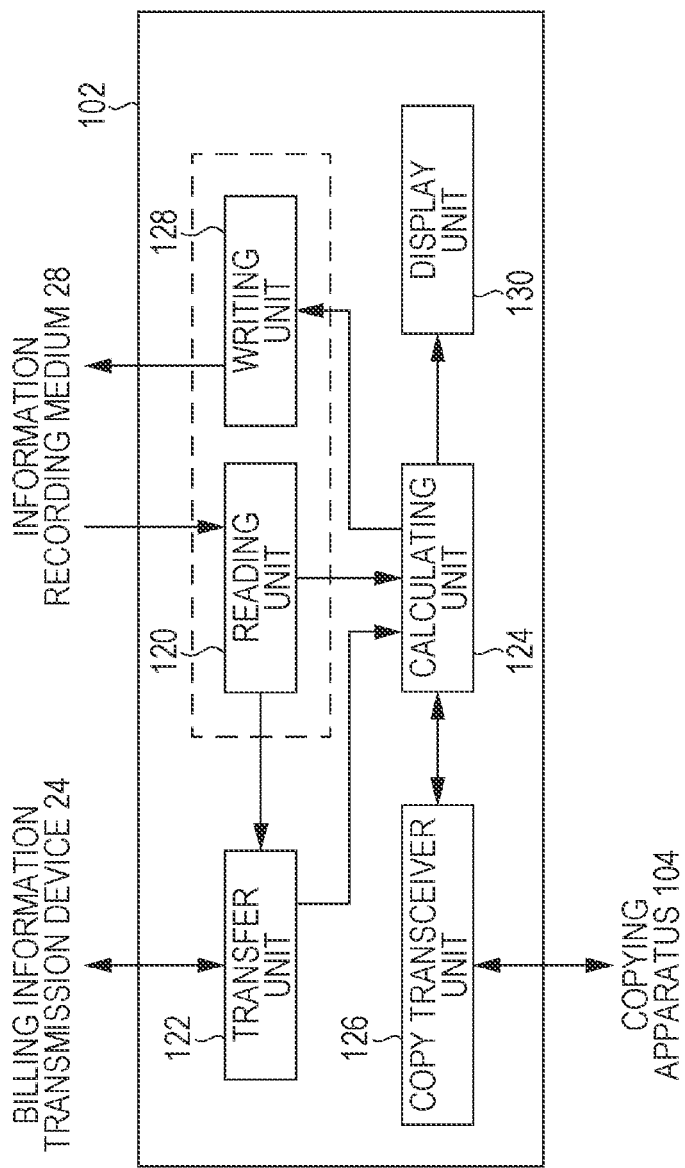
FIG. 7 is a functional block diagram of a reading device of the second exemplary embodiment.

FIG. 7 is a functional block diagram of the reading device 102.

The reading device 102 includes reading unit 120, transfer unit 122, calculating unit 124, copy transceiver unit 126, writing unit 128, and display unit 130.

The reading unit 120 reads from the information recording medium 28 the identification information and the frequency information (see FIG. 4B). The reading unit 120 transfers the read identification information to the transfer unit 122, and the read frequency information to the calculating unit 124.

The transfer unit 122 transfers to the billing information transmission device 24 the identification information received from the reading unit 120. The transfer unit 122 also receives the billing condition corresponding to the identification information from the billing information transmission device 24 and then transfers the billing condition to the calculating unit 124.

The calculating unit 124 receives the frequency information from the reading unit 120, the billing condition from the transfer unit 122, and the copying condition from the copy transceiver unit 126. The calculating unit 124 calculates a value billed for copying based on the billing condition and the copying condition. The calculating unit 124 calculates new frequency information (remaining amount) from the billed value and the received frequency information.

The calculating unit 124 transfers the calculation results to the writing unit 128 and the display unit 130.

If the calculation results are effective, the calculating unit 124 notifies the copy transceiver unit 126 that the calculation results are effective.

Upon receiving from the calculating unit 124 a notification of copy permission, the copy transceiver unit 126 notifies the copying apparatus 104 of a copy permission.

The writing unit 128 writes on the information recording medium 28 the calculation results received from the calculating unit 124 as new frequency information.

In response to the calculation results received from the calculating unit 124, the display unit 130 displays the billed value and the new frequency information, thereby presenting the new frequency information to the user.

The billing operation of the billing management system 100 is described below.

FIG. 8 is a flowchart illustrating the billing operation (S20) of the billing management system 100.

In step S202, the reading device 102 of one of the multiple image forming apparatuses 14 with billing function reads the identification information from the information recording medium 28 of the user, and then transfers the read identification information to the billing information transmission device 24.

For example, the user goes to the image forming apparatus 14 with billing function installed as a desired location, and holds the information recording medium 28 over the reading device 102. The identification information is thus read.

In step S204, the billing information transmission device 24 transmits the identification information received from the reading device 102 to the management apparatus 12.

In step S206, the management apparatus 12 references information managed thereby, and then transmits to the billing information transmission device 24 the billing condition corresponding to the identification information transmitted from the billing information transmission device 24.

If the identification information fails to match the stored information (for example, if no corresponding identification information is present), the management apparatus 12 notifies the billing information transmission device 24 that the identification information fails to match the stored information. In such a case, the identification information is not authenticated, and the user is not permitted to use the copying apparatus 104.

In step S208, the billing information transmission device 24 transfers the billing condition corresponding to the identification information to the reading device 102.

In step S210, the copying apparatus 104 receives the copying condition from the user.

In step S212, the copying apparatus 104 transfers the copying condition received from the user to the reading device 102.

In step S214, the reading device 102 calculates new frequency information based on the billing condition and the copying condition, and notifies the copying apparatus 104 of a copying permission.

If the remaining amount stored on the information recording medium 28 is insufficient, the reading device 102 does not notify the copying apparatus 104 of a copying permission. The user is not permitted to use the copying apparatus 104.

Upon receiving the copying permission, the copying apparatus 104 performs a copying operation under the copying condition. The copying apparatus 104 thus performs the copying operation in response to the request from the user.

In step S216, the billing information transmission device 24 transmits to the calculating apparatus 16 in an associated state the identification information and the copying condition of the copying apparatus 104.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A billing management system, comprising:
an image forming device that forms an image by performing one or more of a printing function and a copying function;
a reading device that reads identification information from an information recording medium that stores the identification information identifying a user of the image forming device;
a billing condition management device that manages, in an associated state, the identification information and a billing condition for forming the image; and
a billing information transmitting unit that references the identification information and the billing condition, managed by the billing condition management device, and transmits billing information in accordance with the billing condition corresponding to the identification information read by the reading device,
wherein the reading device determines, based on the read identification information of the user and the associated billing condition, whether to notify the image forming device of an image forming permission, and the image forming device forms the image if the image forming permission is received and the image forming device does not form the image if the image forming permission is not received,
wherein at least two units of the image forming device and at least two units of the reading device are arranged for one unit of the billing condition management device,
wherein the billing condition management device manages, in an associated state, the identification information and the billing condition on each image forming device,
wherein the billing conditions managed by the billing condition management device comprise a condition specifying billing and a condition specifying free of charge billing,
wherein the reading device calculates a cost for forming the image based on the billing condition and an image forming condition inputted by the user,
wherein the image forming condition is a copying condition.

2. The billing management system according to claim 1, wherein the billing conditions managed by the billing condition management device comprise a condition specifying different unit prices.

3. The billing management system of claim 1, wherein the copying condition includes a number of copies of the image to be formed by the image forming device and a copy mode selected from at least two or more modes including a color mode and a monochrome mode.

4. The billing management system of claim 3, wherein the reading device calculates the cost for forming the image based on the copy mode inputted by the user.

5. A billing management method of a billing management system, comprising:
forming an image using an image forming device which performs one or more of a printing function and a copying function;
reading, using a reading device, identification information from an information recording medium that stores the identification information identifying a user of the image forming device;
managing, using a billing condition management device, in an associated state, the identification information and a billing condition for forming the image;
referencing the managed identification information and the billing condition, and transmitting billing information in accordance with the billing condition corresponding to the read identification information;
determining, based on the read identification information of the user and the associated billing condition, whether to notify the image forming device of an image forming permission, and the image forming device forms the image if the image forming permission is received and the image forming device does not form the image if the image forming permission is not received,
wherein at least two units of the image forming device and at least two units of the reading device are arranged for one unit of the billing condition management device, wherein the managing further comprises managing, by the billing condition management device, in an associated state, the identification information and the billing condition on each image forming device, wherein the billing conditions managed by the billing condition management device comprise a condition specifying billing and a condition specifying free of charge billing; and
calculating a cost for forming the image based on the billing condition and an image forming condition inputted by the user,
wherein the image forming condition is a copying condition.

6. The billing management method of claim 5, wherein the copying condition includes a number of copies of the image to be formed by the image forming device and a copy mode selected from at least two or more modes including a color mode and a monochrome mode.

7. The billing management method of claim 6, wherein the calculating comprises calculating the cost for forming the image based on the copy mode inputted by the user.

* * * * *